US009516396B2

(12) United States Patent
Andrews et al.

(10) Patent No.: US 9,516,396 B2
(45) Date of Patent: Dec. 6, 2016

(54) LOUDSPEAKER BRACKET

(71) Applicant: Funktion One Research, Dorking (GB)

(72) Inventors: Anthony John Andrews, Dorking (GB); Toby Charles Collingwood Hunt, Newdigate (GB); John Newsham, Dorking (GB)

(73) Assignee: FUNKTION ONE RESEARCH, Dorking (GB)

( * ) Notice: Subject to any disclaimer, the term of this patent is extended or adjusted under 35 U.S.C. 154(b) by 0 days.

(21) Appl. No.: 14/230,593

(22) Filed: Mar. 31, 2014

(65) Prior Publication Data

US 2014/0301580 A1    Oct. 9, 2014

(30) Foreign Application Priority Data

Apr. 4, 2013   (GB) .................................. 1306051.2
Nov. 26, 2013  (GB) .................................. 1320851.7

(51) Int. Cl.
| | | |
|---|---|---|
| H04R 25/00 | (2006.01) | |
| H04R 1/02 | (2006.01) | |
| H04R 1/00 | (2006.01) | |
| B60N 2/54 | (2006.01) | |
| B60N 2/50 | (2006.01) | |

(52) U.S. Cl.
CPC .............. *H04R 1/025* (2013.01); *B60N 2/505* (2013.01); *H04R 1/026* (2013.01); *B60N 2/502* (2013.01); *B60N 2/544* (2013.01); *H04R 1/00* (2013.01); *H04R 2201/401* (2013.01); *H04R 2201/405* (2013.01); *H04R 2205/022* (2013.01)

(58) Field of Classification Search
CPC ............... H04R 1/00; H04R 2205/022; H04R 2201/401; H04R 2201/405; H04R 1/025; H04R 1/026; B60N 2/502; B60N 2/505; B60N 2/544

USPC .......................................... 381/182; 248/573
See application file for complete search history.

(56) References Cited

U.S. PATENT DOCUMENTS

| | | | | |
|---|---|---|---|---|
| 3,941,250 | A | * | 3/1976 | Ott ................................ 211/1.3 |
| 4,222,543 | A | * | 9/1980 | Gedig et al. .................. 248/394 |
| 4,953,223 | A | | 8/1990 | Householder |
| 7,328,769 | B1 | | 2/2008 | Adamson |
| 2002/0153195 | A1 | | 10/2002 | Messner |
| 2004/0170295 | A1 | | 9/2004 | Lin |

(Continued)

FOREIGN PATENT DOCUMENTS

| | | |
|---|---|---|
| WO | WO 2011/005093 A1 | 1/2011 |
| WO | WO 2013/025950 A1 | 2/2013 |

OTHER PUBLICATIONS

Great Britain Search Report, GB Application No. GB1306051.2, Sep. 3, 2013, 4 pages.

(Continued)

*Primary Examiner* — Duc Nguyen
*Assistant Examiner* — Sean H Nguyen
(74) *Attorney, Agent, or Firm* — Fenwick & West LLP

(57) ABSTRACT

A bracket for attachment to a first speaker and for suspending a second speaker therefrom. The bracket comprises a suspension member configured for attachment to a second speaker and defining an axis about which a second speaker is free to rotate when attached to the suspension member and an adjustable end stop configured to limit the maximum amount of rotation of a second speaker about the axis of rotation.

15 Claims, 9 Drawing Sheets

(56) References Cited

U.S. PATENT DOCUMENTS

2005/0232455 A1  10/2005  Monitto et al.
2007/0000719 A1   1/2007  Bothe
2011/0305361 A1  12/2011  Li et al.
2014/0205132 A1*  7/2014  Spillmann et al. ........... 381/387

OTHER PUBLICATIONS

European Search Report for European Patent Application No. EP 14161885, Jun. 4, 2014, 5 Pages.

\* cited by examiner

LOUDSPEAKER BRACKET

CROSS REFERENCE TO RELATED APPLICATIONS

This application claims the benefit of GB Application No. 1320851.7, filed Nov. 26, 2013, and claims the benefit of GB Application No. 1306051.2, filed Apr. 4, 2013, which are both incorporated by reference in their entirety.

TECHNICAL FILED

The invention relates to a speaker bracket. In particular, the invention relates to a bracket for attachment to a speaker and for suspending a further speaker therefrom.

BACKGROUND

In public address systems for use at large venues, such as in large auditoria or outdoor areas, where high sound levels and/or large audiences are to be covered, it is known to use arrays of loudspeakers mounted above the ground or "overhead" and suspended from above. In the case of such arrays of loudspeakers, the loudspeakers typically are arranged as one or more columns and are required to be angled relative to each other so as to provide the desired vertical coverage of sound. In certain arrangements, the speakers will be angled to produce a "J" shape.

Typically, each column comprises a top loudspeaker which is attached to a lifting frame. The other loudspeakers of the column are suspended from each other by links and by pivotal arrangements, typically at the front and rear providing a range of inter-loudspeaker angles. In order to deploy some systems of this type, the bracket is attached at ground level to a lifting frame and the speakers are mounted, a level at a time, to the bracket or to the loudspeakers above by links. After each level of loudspeakers has been attached in this way, the lifting frame is raised to allow room for the next level of loudspeakers to be mounted.

When each column is lifted off the ground, the loudspeakers are tilted with respect to each other in a vertical plane. Some such attaching arrangements require that numbers of external components have to be transported. Such components can easily be lost in transit, during deployment and during disassembly of systems of this type.

SUMMARY

According to an aspect of the invention, there is provided a bracket for attachment to a first speaker and for suspending a second speaker therefrom, the bracket comprising: a suspension member configured for attachment to a second speaker and defining an axis about which a second speaker is free to rotate when attached to the suspension member; and an adjustable end stop configured to limit the maximum amount of rotation of a second speaker about the axis of rotation.

The suspension member may allow the second speaker to be rotated about the axis of rotation while it is suspended from the first speaker. This allows the second speaker to be rotated under load.

The adjustable end stop may be configured to allow adjustment of the end stop when the second speaker hangs freely from the suspension member in an equilibrium suspended state. Therefore, the end stop may be adjusted whilst the second speaker is suspended from the first speaker. In such arrangements, a plurality of speakers including the bracket may be suspended in a speaker column and the end stop of each bracket may be configured to produce a particular configuration of speakers in the column when a force is applied to lift the last speaker. That is, the force causes each speaker to rotate about the axis of rotation until the limit of rotation of each speaker is met. If the configuration of the column requires adjustment, for example, for acoustic reasons, the force may be removed to allow each speaker to hang freely in an equilibrium state in which each end stop may be adjusted. One or more end stops may be adjusted to adjust the configuration of the speakers in the speaker column and the force may be applied again. This allows adjustment of the speaker column while it is suspended under load.

Optionally, the suspension member comprises two connection arms rotatable about a fulcrum.

Optionally, the connection arms are rigidly connected.

Optionally, the fulcrum comprises a trunnion, and wherein a surface of the connection arms is shaped to cooperate with a surface of the trunnion to allow a second speaker to rotate freely about the axis of rotation when attached to the suspension member.

Optionally, the end stop is configured to limit rotation of a second speaker suspended from the suspension member when rotated by application of a force, the end stop being further configured to allow the second speaker to return to an equilibrium suspended state when the force is removed.

Optionally, the suspension member further comprises an end stop arm configured to move towards the end stop on rotation of a second speaker suspended from the suspension member and engage with the end stop to limit rotation of the second speaker.

Optionally, the end stop arm extends perpendicular to the axis of rotation.

Optionally, the connection arms and the end stop arm substantially form the shape of a lambda.

Optionally, the adjustable end stop is rotatable to present one of a plurality of end stop faces to the end stop arm, wherein each of the plurality of end stop faces defines a different maximum amount of rotation of the second speaker.

Optionally, the adjustable end stop comprises a rotatable cam shaped member, and wherein the end stop faces are arranged around an outer edge of the cam shaped member.

Optionally, the plurality of end stop faces are configured such that, when the end stop arm is engaged with an end stop face, a force applied by the end stop arm on the end stop face is directed through an axis of rotation of the adjustable end stop.

Optionally, the axis of rotation is substantially equidistant between a first speaker and a second speaker.

Optionally, the bracket further comprises a frame housing the suspension member and attachable to a sidewall of a speaker enclosure of a first speaker, and wherein the suspension member is moveable between a retracted position within the frame and an extended position at which the suspension member is attachable to the second speaker.

According to the invention in a further aspect, there is provided a speaker comprising an audio driver, a speaker enclosure and a bracket according to any preceding claim and attached to a sidewall of the speaker enclosure.

According to the invention in a further aspect, there is provided a speaker column comprising a plurality of speakers according to claim 12, wherein each speaker is suspended from a preceding speaker in the column.

According to the invention in a further aspect, there is provided a bracket for attachment to a speaker and for suspending a further speaker therefrom. The bracket comprises a frame and a suspension member. The suspension member is configured for attachment to a bracket attached to a further speaker such that the further speaker is rotatable about an axis of rotation defined by the suspension member. The suspension member is configured such that the axis of rotation is between the speaker and the further speaker.

As used herein, the term "bracket" encompasses any apparatus suitable for supporting a loudspeaker. The support may be provided from beneath or by suspension from above. In particular, a bracket for attachment to a loudspeaker encompasses an apparatus that may be fixed to a sidewall of a loudspeaker and may thereby provide support to the loudspeaker. A bracket for a loudspeaker may be suspended from a separate bracket fixed to a separate loudspeaker, or may be suspended from a lifting frame. In this way, a bracket may be considered a "suspension".

The axis of rotation may be equidistant between the speaker and the further speaker.

According to the invention in a further aspect, there is provided a bracket for attachment to a speaker and for suspending a further speaker therefrom. The bracket comprises a frame and a suspension member. The suspension member is moveable between a retracted position and an extended position in which the suspension member projects from the frame and defines an axis of rotation. The suspension member is configured in the extended position for attachment to a frame of a further bracket attached to a further speaker such that the further speaker is rotatable about the axis of rotation. The suspension member is configured in the extended position such that the axis of rotation is between the speaker and the further speaker.

The axis of rotation may be equidistant between the speaker and the further speaker.

The suspension member may be configured in the extended position such that the axis of rotation is in a range from 0.5 mm to 2.5 mm outside an outer edge of a speaker enclosure of the speaker.

The axis of rotation may be defined at a point outside the frame.

In the retracted position, the suspension member may be entirely within an outer edge of a speaker enclosure of the speaker.

The suspension member may be lockable in the retracted position.

Placing the axis of rotation between the speaker and the further speaker allows the speakers to be rotated relative to each other without them becoming misaligned. That is, without a distance from a virtual point source to a driver of the speaker becoming different for the speaker and the further speaker.

According to the invention in a further aspect, there is provided a bracket for attachment to a speaker and for suspending a further speaker therefrom. The bracket comprises a frame and a suspension member. The suspension member is moveable between a retracted position and an extended position in which the suspension member projects from the frame and defines an axis of rotation. The suspension member is configured in the extended position for attachment to a frame of a further bracket attached to a further speaker such that the further speaker is rotatable about the axis of rotation. The suspension member is configured in the extended position such that the axis of rotation is substantially equidistant between an audio driver of the speaker and an audio driver of the further speaker.

In this way, the audio drivers are not misaligned upon relative rotation of the speakers.

According to the invention in a further aspect, there is provided a speaker comprising an audio driver, a speaker enclosure and a bracket as disclosed herein and attached to the speaker enclosure. The bracket may be attached to an outer face of the speaker enclosure. Alternatively, the bracket may be integrated within the speaker enclosure itself.

The speaker may comprise two brackets attached to opposing walls of the speaker enclosure.

According to the invention in a further aspect, there is provided a speaker column comprising a plurality of speakers as described herein, wherein each speaker is suspended from the preceding speaker in the column. The first speaker in the column may be fixedly or rotatably connected to a frame, such as a scaffold or lifting frame.

BRIEF DESCRIPTION OF THE DRAWINGS

Exemplary embodiments of the invention are disclosed with reference to the accompanying drawings, in which.

DESCRIPTION

When rigging a sound system for a large venue or outdoor event, it is common to use multiple speakers arranged in vertical columns. Typically, a speaker comprises an enclosure and audio drivers located within the enclosure and configured as a transducer to convert electrical signals into an audio output.

In order to preserve high fidelity sound from such a system, it is desirable that the speakers are arranged such that the sound heard by a listener at any position appears to originate from a single point source. Typically, this is achieved by angling the speakers with respect to each other such that notional lines taken through the centre of audio drivers in each of any pair of adjacent speakers converge on a single point, and that the distance from such point to each driver is the same. This point is termed a virtual point source.

Figure 1:
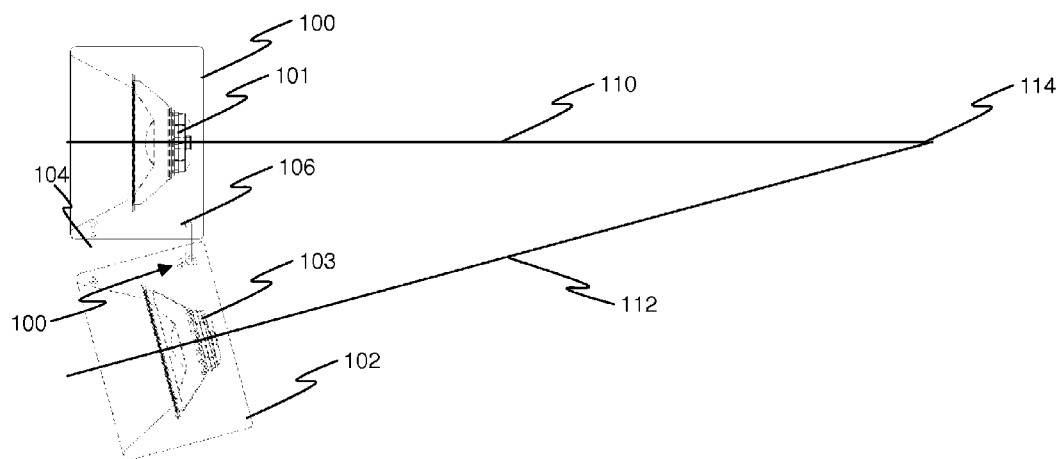
FIG. 1 is a schematic representation of a speaker having a further speaker suspended therefrom.

Referring to FIG. 1, a first speaker 100 has a second speaker 102 suspended from it. The first speaker comprises a first audio driver 101 and the second speaker comprises a second audio driver 103. The second speaker 102 is suspended from the first speaker 100 using a front link 104 and a rear link 106. The second speaker 102 has a plurality of holes 108 made in its enclosure that allow for adjustment of the angle between the first and second speakers 100, 102. By connecting the rear link 106 to a different one of the holes 108, the angle can be adjusted. Other systems may use front and/or rear links of varying lengths, which may be fitted to achieve the desired angle between the speakers.

Centre axes 110, 112 may be taken rearwards from the audio drivers 101, 103 to a point 114 at which they converge. The point 114 is considered to be the virtual point source of the sound.

The inventors have appreciated that, in order to produce high quality sound, the distance between the virtual point source 114 and each off the audio drivers 101, 102 should be the same for each speaker 100, 102.

As shown in FIG. 1, the angle may be defined by rigid front and rear links 104, 106. However, the inventors have appreciated that such systems are difficult and fiddly to erect as they typically require a skilled operative to fit the links 104, 106 and the speakers 100, 102 at height using pins. In addition, the links 104, 106 themselves, if loose, are easily lost. It is noted that the pattern of holes 108 is complicated and not simply linear. This is because the fine adjustments required are often smaller in dimension than the diameter of a bolt or pin strong enough to hold the weight of the speaker.

Further, the inventors have appreciated that, if the tilt angles are defined by rigid links between the speakers and must be changed following erection, e.g. for sound coverage purposes, this may only be achieved by lowering the column to the ground so that the loudspeakers rest on top of each other, releasing tension in the links. The links may then be changed in length or replaced by links of a different length in order to alter the relative tilt angles. The column may then be lifted off the ground and raised to the desired operating position. This is an inconvenient and time-consuming operation.

The inventors have also appreciated that, if the main suspension point is a pivot in line with the centre of mass of the enclosure and that the method of setting the vertical angle between them is separate then the vertical angle can be adjusted without lowering the column to the ground. It is only necessary to alter an angle setting stop (or end stop) while temporarily removing the lifting force applied to the rear of the lowest enclosure, as set out in detail below.

Figure 2:
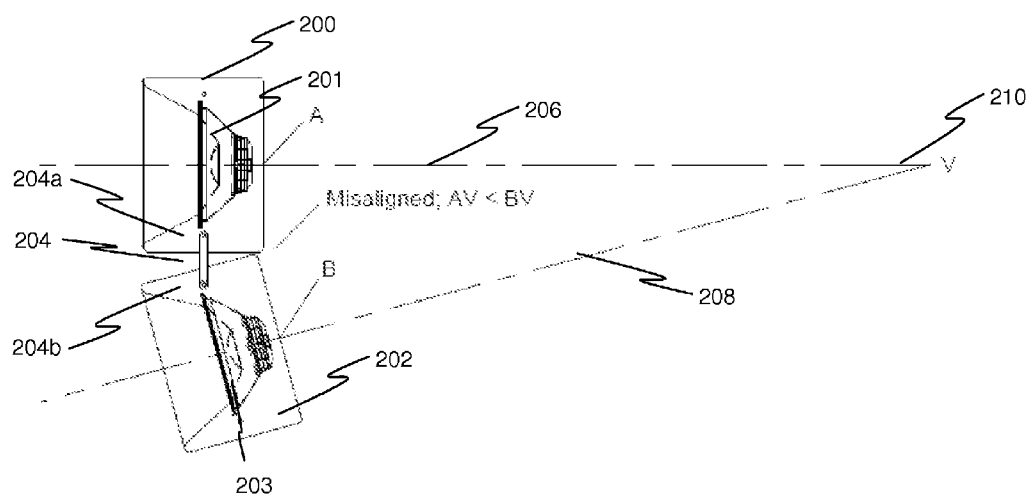
FIG. 2 is a schematic representation of a speaker having a further speaker suspended therefrom.

Referring to FIG. 2, a (first) speaker 200 has a further (second) speaker 202 suspended from it by a rigid link 204. The rigid link 204 is connected to the first speaker 200 at a first connection point 204a and to the second speaker 202 at a second connection point 204b. The second speaker 202 is allowed to rotate about the second connection point 204b such that the centre lines 206, 208 passing through the audio drivers 200, 202 converge at the virtual point source 210.

However, the inventors have appreciated that the configuration of FIG. 2 results in misalignment of the speakers 200, 202. That is, the distance between an audio driver 201 in the first speaker 200 and the virtual point source 210 is not the same as the distance between an audio driver 203 in the second speaker 202 and the virtual point source 210. It is noted that the distances in FIG. 2 are taken between the virtual point source 210 (V) and the backs of the speakers 200, 202 (A, B). However, the points A and B are arbitrary and can be any point in relation to the drivers 201, 203 so long as the same points are used for both. In many speaker configurations, the speakers are the same and the audio drivers are located in the same place within the speaker enclosure. In such configurations, reference points on the speaker enclosures may be used.

The inventors have appreciated that, to maintain alignment between the speakers, an axis of rotation between the speakers must be equidistant between the audio drivers. As mentioned above, in certain configurations, two adjacent speakers in a column will have an identical layout of audio drivers and the axis of rotation may therefore be at a point between the speakers. Preferably, the axis of rotation is equidistant between the speaker enclosure and the further speaker enclosure. This is explained in more detail below.

Figure 3:
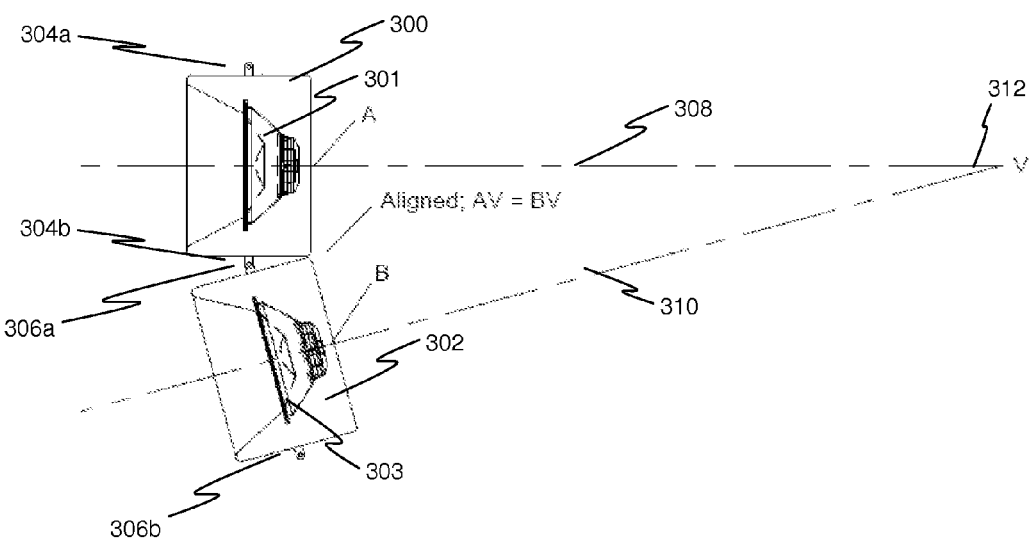
FIG. 3 is a schematic representation of a speaker having a further speaker suspended therefrom.

FIG. 3 shows a first speaker 300 having a second speaker 302 suspended from it. The first speaker 300 comprises upper and lower suspension members 304a, 304b. Similarly, the second speaker 302 comprises upper and lower suspension members 306a, 306b. In the arrangement of FIG. 3, the second speaker 302 is suspended from the first speaker 300 by pivotable connection between the lower suspension member 304b of the first speaker 300 and the upper suspension member 306a of the second speaker 302. The pivotable connection may be provided by, for example, a pin or bolt.

As such, the second speaker is free to rotate about an axis defined by the pivotable connection. As the axis of rotation is equidistant between an audio driver 301 of the first speaker 300 and the audio driver 303 of the second speaker 302, when the second speaker 302 is rotated such that the centre lines 308, 310 of the two speakers 300, 302 converge on the virtual point source 312, the speakers 300, 302 are aligned. That is, the distance between the virtual point source 312 and the first audio driver 301 is the same as the distance between the virtual point source 312 and the second audio driver 303.

In practice, the axis of rotation is between the first speaker 300 and the second speaker 302. As the audio drivers 301, 303 are located in the same position within the speakers 300, 302, the effect is that the axis of rotation is equidistant between the audio drivers 301, 303. However, as is clear from the rest of this document, it is not essential that the axis of rotation is between the first speaker 300 and the second speaker 302. In exemplary arrangements, the axis of rotation may be positioned at other locations.

The suspension members 304a, 304b, 306a, 306b project from the speaker enclosures of the speakers 300, 302 and therefore represent a hazard when the speakers 300, 302 are transported or stored. In addition, the suspension members 304a, 304b, 306a, 306b are likely to be knocked, bent and/or sheared off during transportation or storage.

Figure 4A:
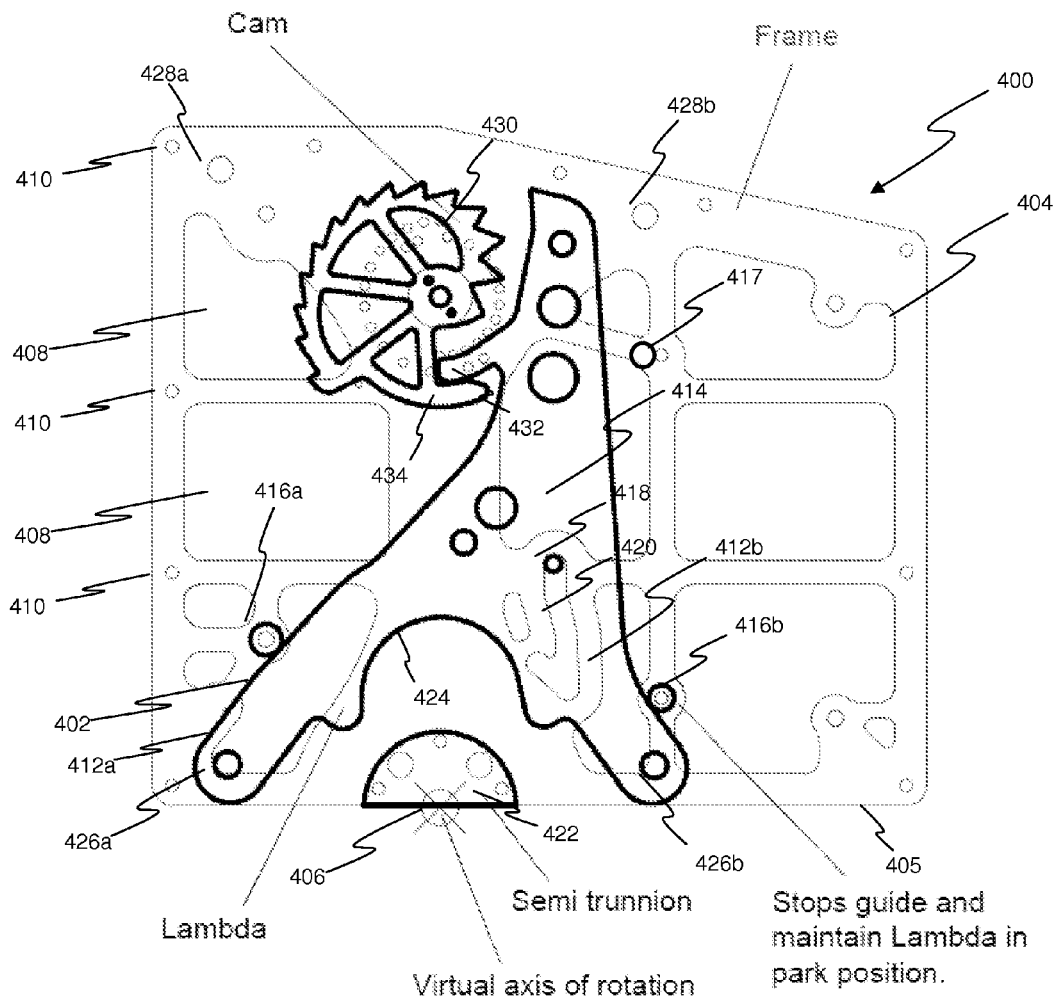
FIGS. 4a-c show schematic representations of a bracket in different configurations.
Figure 4B:
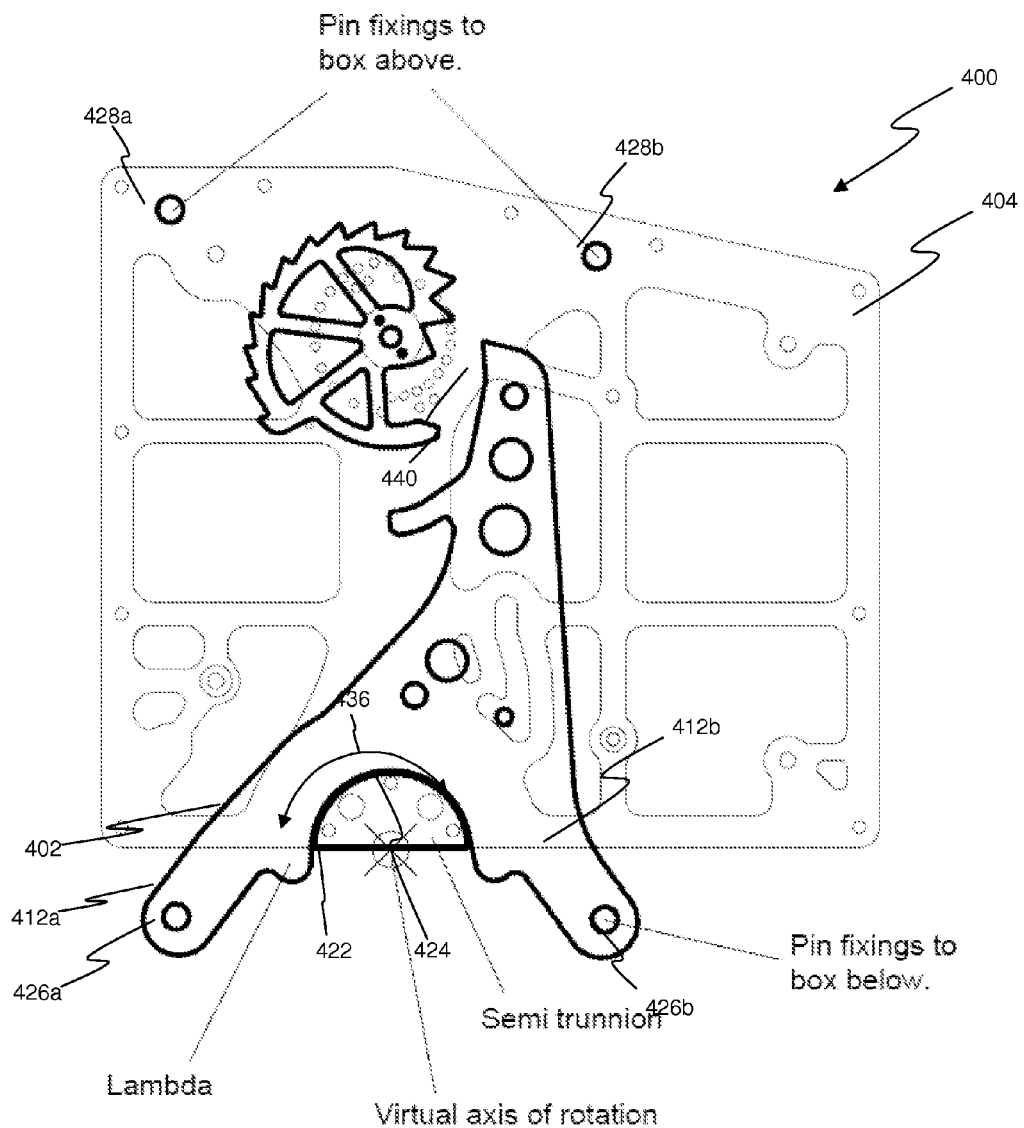
Figure 4C:
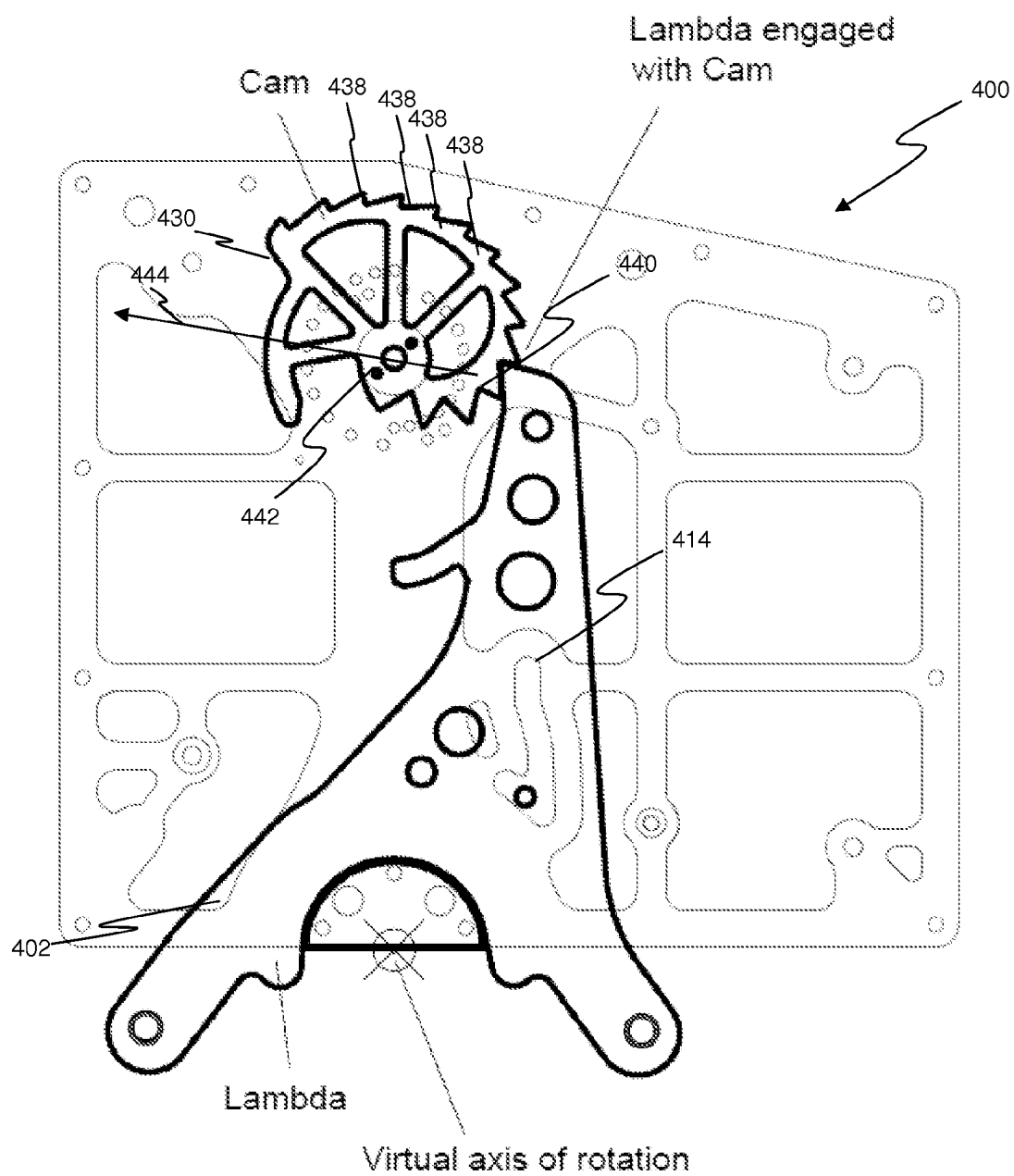

FIGS. 4a-c show a bracket 400 for attachment to a speaker and for suspending a further speaker therefrom. The bracket 400 is shown with a suspension member 402 in three different configurations in FIGS. 4a-c.

Referring to FIG. 4a, the bracket 400 comprises a suspension member 402 and a frame 404. The suspension member 402 is retractable within the frame 404 such that does not project from the frame 404. As discussed in detail below, the suspension member 402 is configured for attachment to a frame of a further bracket to define an axis of rotation 406.

The frame 404 comprises two sheets separated by a plurality of spacers. The sheets have a generally square profile. In the exemplary bracket 400 of FIGS. 4a-c, the frame 404 has an upper right corner chamfered. The frame 404 may have a size and shape corresponding to a sidewall of a speaker enclosure. In particular brackets 400, the frame 404 may be the same size and shape as a sidewall of a speaker enclosure.

It is noted that the terms upper, lower, left, right, vertical, horizontal and other similar relative terms are used herein to aid description and need not imply any limitation on the apparatus disclosed.

The suspension member 402 is retained between the sheets of the frame 404 and may be retracted within the frame 404 and extended to project from the frame 404.

The bracket 400 may be manufactured from any material with sufficient strength to support a further speaker, or speakers, suspended from it. Exemplary brackets 400 may be manufactured from metal, such as steel.

The frame 404 comprises a plurality of cut-out sections 408, which save weight without compromising strength. The frame 404 also comprises a plurality of fixing points 410 around its periphery. The fixing points 410 are configured to allow bolts, screws and/or pins to be used to attach the frame to a sidewall of a speaker enclosure.

The suspension member 402 comprises two connection arms 412a, 412b. The suspension member 402 comprises an end stop arm 414. The connection arms 412a, 412b and the end stop arm 414 together form a lambda shape. It is noted that, as set out above in respect of FIG. 3, the suspension member may comprise a single connection arm 304a-b, 306a-b or may comprise other arrangements.

The suspension arm is moveable between a retracted position and an extended position. In FIG. 4a, the suspension member 402 is shown in the retracted position. Two of the spacers between the sheets of the frame 404 also act as stops 416a, 416b. The stops 416a, 416b restrict the travel of the suspension member 402 when retraced within the frame 404. A further stop 417 is positioned to limit lateral movement of the end stop arm 414.

The suspension member 402 comprises a pin 418 that projects from a sheet of the frame 404 through a guide 420. The pin 418 and the guide 420 act to guide the suspension member 402 from its retracted position to its extended position. The pin 418 may also act as a handle, by which a user may retract or extend the suspension member 402.

The bracket 400 also comprises a trunnion 422 positioned between the sheets of the frame 404. The trunnion 422 acts as a fulcrum about which the two connection arms 412a, 412b are rotatable to define an axis of rotation 406. However, it is noted that other arrangements may provide such a fulcrum. The term "fulcrum" encompasses, for example, any pivotable connection or other support allowing the suspension member to rotate.

The trunnion 422 has a curved upper surface that follows a radius from the axis of rotation 406, which, in the exemplary bracket 400, is below the trunnion and the outer edge of the frame 404. Therefore, the trunnion 422 forms an arc that is less than semi-circular. That is, the trunnion 422 is a circular segment, the boundary of which is defined by a circular arc and a chord of that circle. The trunnion 422 may therefore be described as a partial trunnion as it has a section that is not fully circular.

The suspension member 402 abuts or rests on the trunnion 422 in its extended position. The connection arms 412a, 412b of the suspension member 402 are connected around the arc surface of the trunnion 422. The connection between the connection arms 412a, 412b comprises an arc surface 424 corresponding to the arc formed by the trunnion 422. The arc surface 424 is configured to rest on the arc of the trunnion 422 when the suspension member 402 is in the extended position. Therefore, the trunnion 422 is also configured to retain the suspension member 402 within the frame 404, when it is the extended position. When the suspension member 402 is extended, it is rotatable about the axis of rotation 406.

The connection arms 412a, 412b comprise suspension fixing points 426a, 426b. Further, the frame 404 comprises suspension fixing points 428a, 428b. The suspension fixing points 426a, 426b are configured to be connected to the suspension fixing points 428a, 428b of a further frame 404 attached to a further speaker. The further speaker may therefore be suspended from the first speaker. The connection may be made by a pin inserted through each of the fixing combinations 426a, 428a and 426b, 428b.

The bracket comprises a cam shaped member 430 positioned between the sheets of the frame 404. The cam shaped member 430 forms an adjustable end stop configured to limit the maximum amount of rotation of a second speaker. The end stop restricts the maximum amount of rotation of the suspension member 402. The cam 430 is rotatable within the frame 404 to select a limit of rotation for the suspension member 402 and, therefore, a speaker suspended from the suspension member 402. This is explained in greater detail below. The cam 430 is also selectively engageable with the end stop arm 414 to retain the suspension member 402 in the retracted position. The end stop arm 414 extends away from the axis of rotation 406 into the frame 404. The end stop arm 414 comprises a retention lug 432 configured to engage with a hook 434 to retain the suspension arm 402 in the retracted position.

Figure 5A:
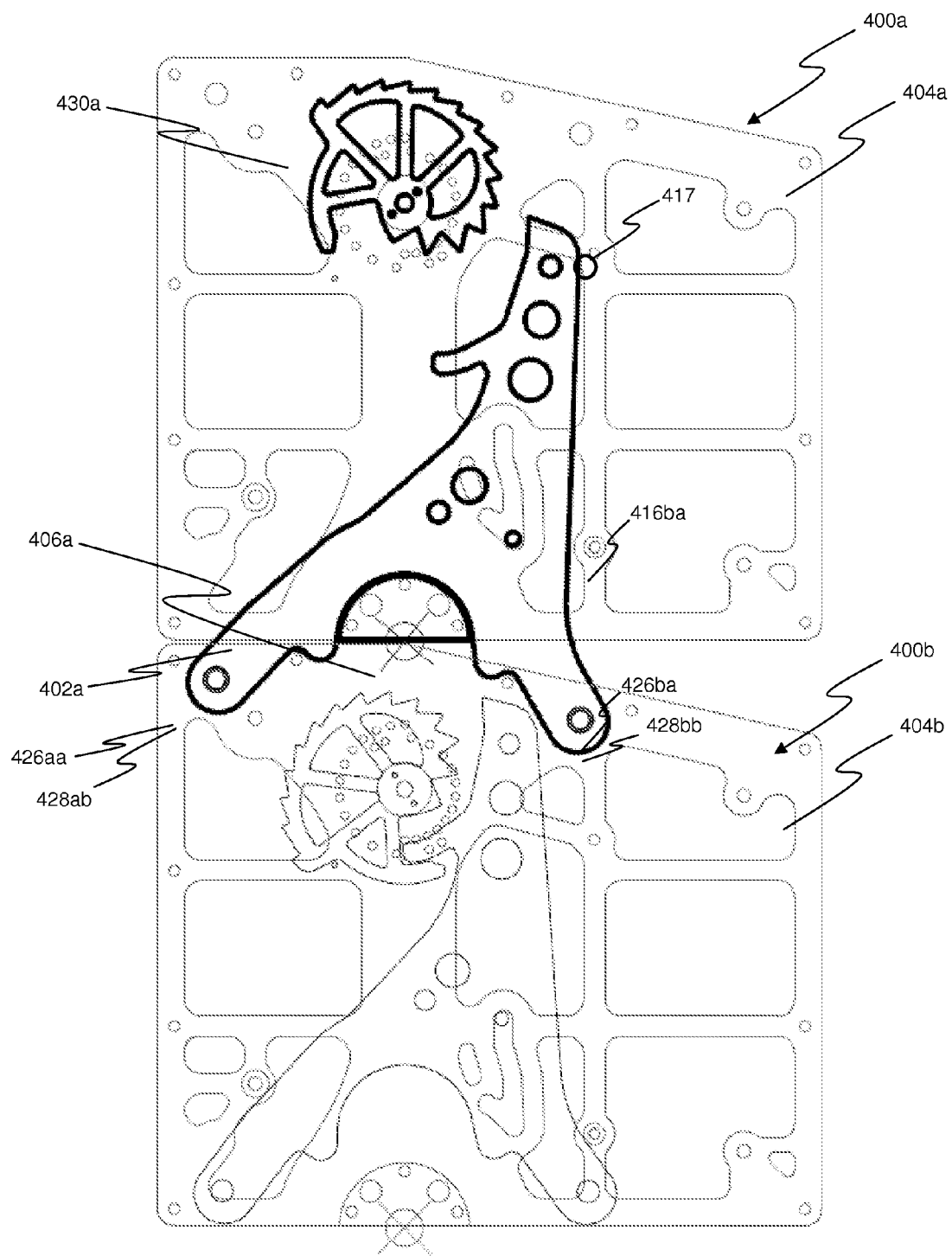
FIGS. 5a-b show a schematic representation of a first bracket and a second bracket connected together.
Figure 5B:
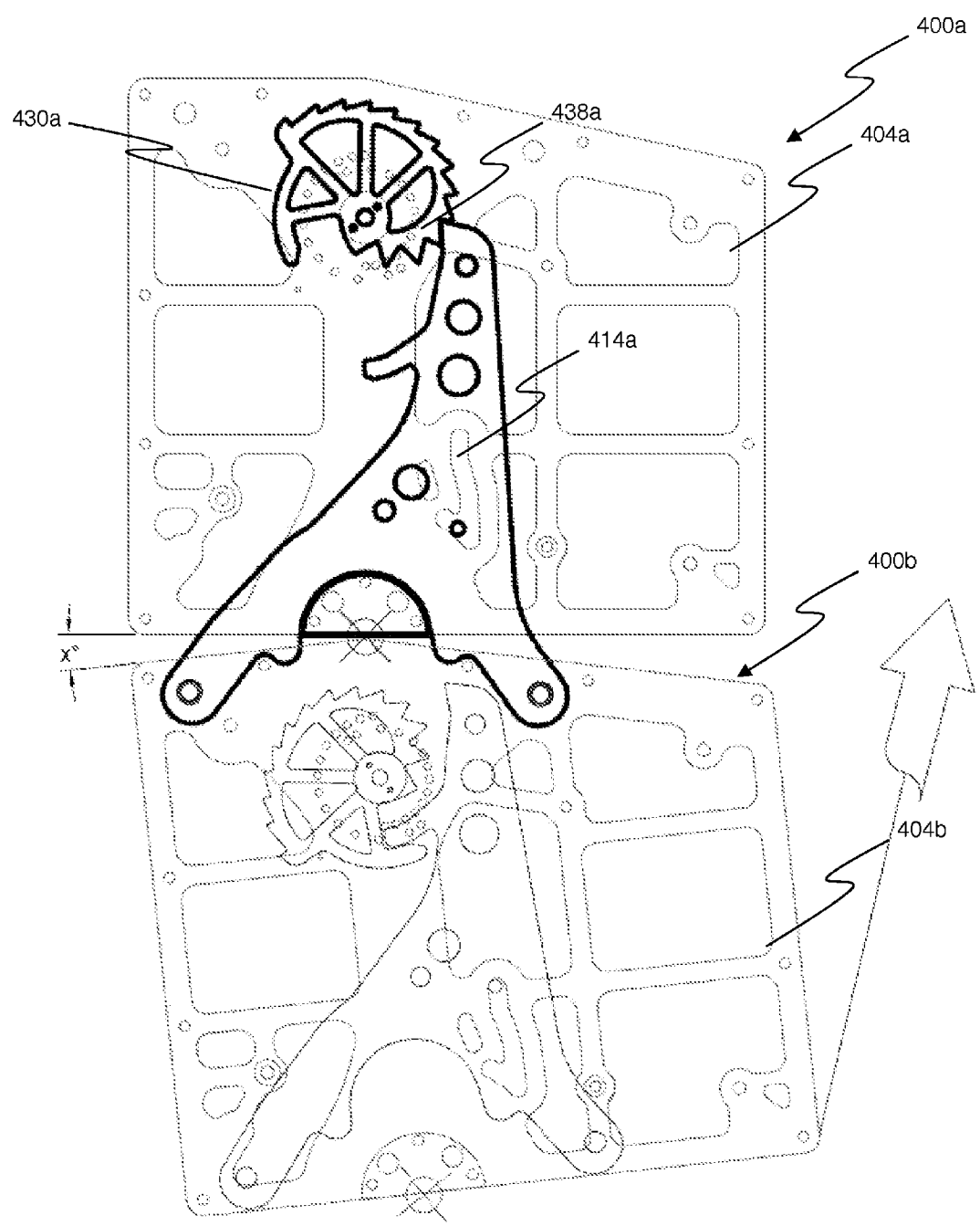

The cam 430 is configured to limit the rotation of a second speaker when a force is applied to rotate the speaker, as shown in FIG. 5b. The cam 430 is further configured to allow the second speaker to return to an equilibrium suspended state when the force is removed, as can be seen in FIG. 5a. The term "equilibrium suspended state" encompasses the state in which a speaker is suspended and rests in a suspended state under gravity. Typically, all speakers in a speaker column will hang vertically when in an equilibrium suspended state.

To retract the suspension arm, a user slides the pin 418 in the guide 420 to retract the connection arms 412a, 412b within the frame 404. The cam is then rotated counter clockwise (in the view shown) to position the hook 434 underneath the retention lug 432 to prevent the suspension member 402 from extending from the frame 404.

Referring to FIG. 4b, the suspension member 402 is shown in the extended position. The arc surface 424 of the suspension member 402 is resting against the corresponding arc surface of the trunnion 422. This defines the rotation axis 406 about which the suspension arm 402 is rotatable. The rotation of the suspension member 402 is shown by arrow 436. Because the trunnion 422 is a circular segment, the axis of rotation 406 (which is the centre of the circular arc of the trunnion) is outside the trunnion 422. Further, the trunnion 422 is positioned at the edge of the frame 404 such that the axis of rotation 406 is outside the frame 404.

The connection arms 412a, 412b project from the frame 404 and the suspension fixing points 426a, 426b may be connected to the suspension fixing points 428a, 428b of a corresponding frame attached to a further speaker.

Referring to FIG. 4c, the cam 430 has been arranged to form an end stop to limit the rotation of the suspension member 402 about the axis of rotation 406. In the position shown in FIG. 4c, the suspension member 402 may be rotated between the limits of, the outer edge of the cam 430 and the stop 417.

The cam 430 is configured to alter the limit of rotation of the suspension member 402. Specifically, the cam 430 comprises a plurality of end stop faces 438. The cam may be rotated such that a different end stop face 438 is presented to an engagement face 440 of the end stop arm 414 of the suspension member 402. Each end stop face 438 provides a different limit of rotation of the suspension member 402 and, therefore, of the further speaker.

Each of the end stop faces 438 of the cam 430 is arranged such that it is parallel with the engagement face 440 of the end stop arm 414 when the cam 430 is rotated to a position in which it is presented to the engagement face 440. Further, the cam 430 is arranged such that when the cam 430 is rotated to a position in which it is presented to the engagement face 440, the force 444 acting on the end stop face 438 from the end stop arm 414 passes through the axis of rotation 442 of the cam 430. This prevents any of the force 444 acting to try and rotate the cam 430. Further, this results in the force 444 passing through the point at which the cam 430 is attached to the sheets of the frame 404, which is the strongest point of the cam 430. The cam 430 may be fixed at a given rotation by a locking mechanism.

The axis of rotation 406 is outside the outer edge 405 of the frame 404. The outer edge 405 of the frame 404 is the lower outer edge when the frame 404 is in an upright position. When the frame 404 is attached to a sidewall of a speaker enclosure such that the lower outer edge 405 of the frame 404 is aligned with the lower outer edge of the sidewall, the axis of rotation is positioned outside the lower outer edge of the speaker enclosure. Therefore, when a first speaker has a second speaker suspended from it, the axis of rotation 406 is equidistant between the speakers.

In exemplary brackets 400, the suspension member 402 is configured such that, when the suspension member 402 is connected to a second frame, the axis of rotation 406 is between the first and second frames. In a specific exemplary bracket 400, the axis of rotation is equidistant between a lower edge 405 of the first frame 404 and an upper edge of the second frame. In a further specific exemplary bracket 400, the axis of rotation 406 may be outside the outer edge 405 of the frame 404 by a distance in a range from 0.5 mm to 2.5 mm, or more than 2.5 mm. In one example, the distance may be 1.5 mm.

FIG. 5a shows a first bracket 400a connected to a second bracket 400b. The frames 400a, 400b may be attached to first and second speakers, but the speakers are not shown in FIG. 5a. In arrangements in which the brackets 400a, 400b are attached to speakers, rotation of a bracket 400a, 400b results in, and can therefore be understood to mean, rotation of the corresponding speaker. In FIG. 5a, the second speaker 400b is in an equilibrium suspended state.

The cam 430a of the bracket 400a is rotated to a position to set the desired limit of rotation of the suspension member 402a. This cam 430a may be adjusted while the second speaker is in the equilibrium suspended state as no force is applied to the cam 430a. Thus, the maximum rotation of the second speaker 400b may be adjusted while the second speaker 400b is suspended from the first speaker 400a. In exemplary brackets, this may be done using a dial 448 (shown in FIGS. 7a and 7b) which is directly linked to the cam and may be fixed in one of a plurality of pre-set positions relating to a limit of rotation of the suspension member 402a. The dial 448 may be fixed in a pre-set position by insertion of a pin through a hole in the dial 448 and a corresponding hole in the frame 404a. The suspension member 402a of the bracket 400a is connected to the frame 404b of the bracket 400b. This is done by alignment of the suspension fixing point 426aa of bracket 400a with the suspension fixing point 428ab of the bracket 400b and placing a fixing through the aligned apertures. Similarly, the suspension fixing point 426ba of bracket 400a is aligned with the suspension fixing point 428bb of the bracket 400b and a fixing placed through the aligned apertures. The fixing may be a pin.

Once the brackets 400a, 400b are connected in this way, the suspension member 402a is free to rotate about the axis of rotation 406a within the limits imposed by the cam 430a and the stop 417. The axis of rotation 106a is between the frames 404a, 404b. Therefore, when the bracket 400b is rotated relative to the bracket 400a, the brackets 400a, 400b remain aligned with respect to a virtual point source, as explained above.

This is shown in FIG. 5b, which shows a force being applied to pull the rear of bracket 400b upwards to rotate it until the end stop arm 414a engages with an end stop face 438a of the cam 430a. The second bracket 400b has been rotated by an amount defined by the position of the cam 430a. The cam 430a may be fixed in one of a plurality of positions by means of a fixing mechanism. Each position of the cam 430a defines a specific rotation of the second bracket 400b with respect to the first bracket 400a. Markings may be made on the outside of an outer sheet of the frames 404a, 404b, or on a separate dial, to indicate the amount of rotation of the suspension member 402a (and therefore the second bracket 400b) for a given position of the cam 430a.

When the frames are attached to speaker enclosures, the speaker enclosures also remain aligned with respect to the virtual point source when the lower speaker is rotated about the axis of rotation 406a.

Figure 6:
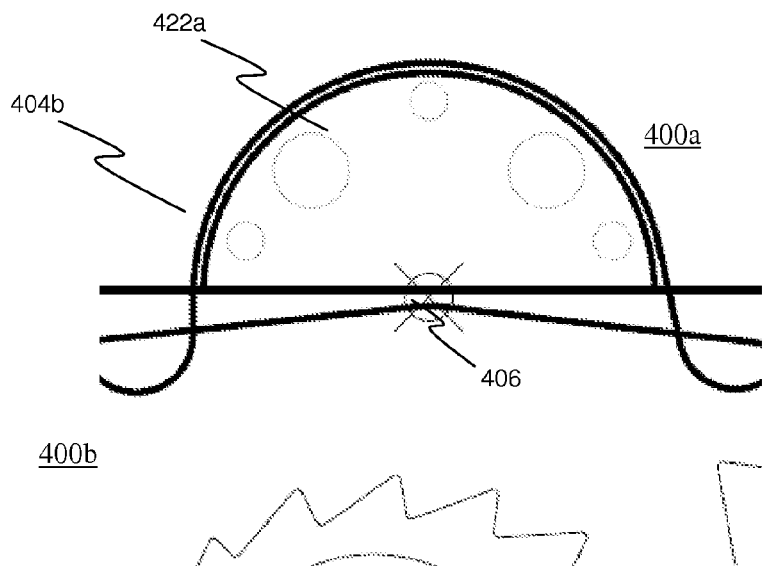
FIG. 6 shows a close-up view of an axis of rotation between first and second brackets.

FIG. 6 shows a close-up view of the axis of rotation 406 between the first bracket 400a and the second bracket 400b. The suspension member 402a of the first bracket 400a is resting on the trunnion 422a of the first bracket 400a. Therefore, the suspension member 402a is in an extended position and is connected to the frame 404b of the second bracket 400b. The axis of rotation is shown between the frame 404a of the first bracket 400a and the frame 404b of the second bracket 400b. In the exemplary arrangement of FIG. 6, the axis of rotation 406 is equidistant between the two frames 404a, 404b. The axis of rotation 406 may be equidistant between an audio driver of a first loudspeaker, to which the first bracket 400a is attached, and an audio driver of a second loudspeaker, to which the second bracket 400b is attached.

Figure 7A:
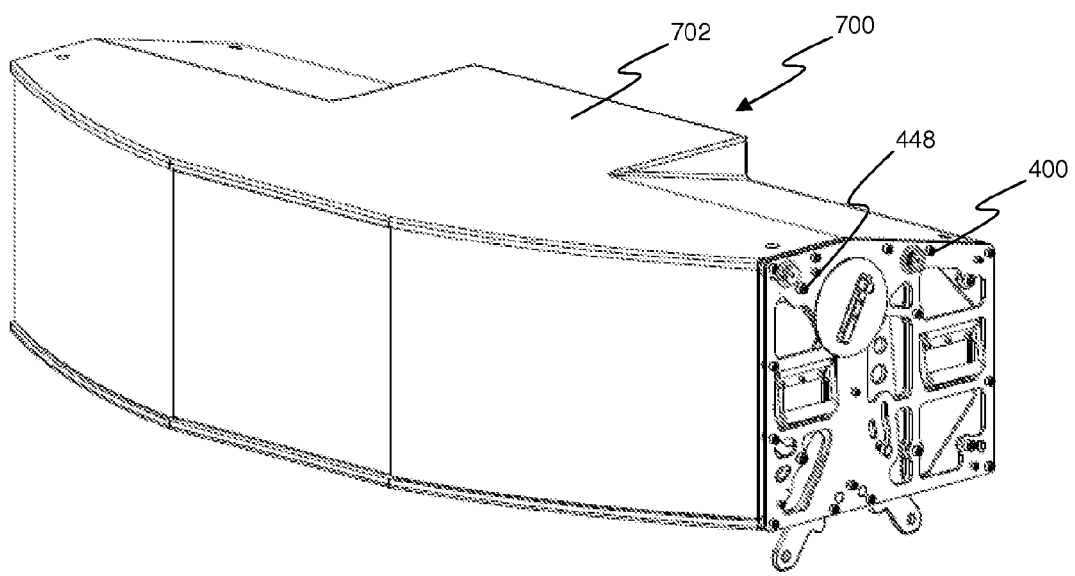
FIGS. 7a-b shows a speaker with a bracket attached.
Figure 7B:
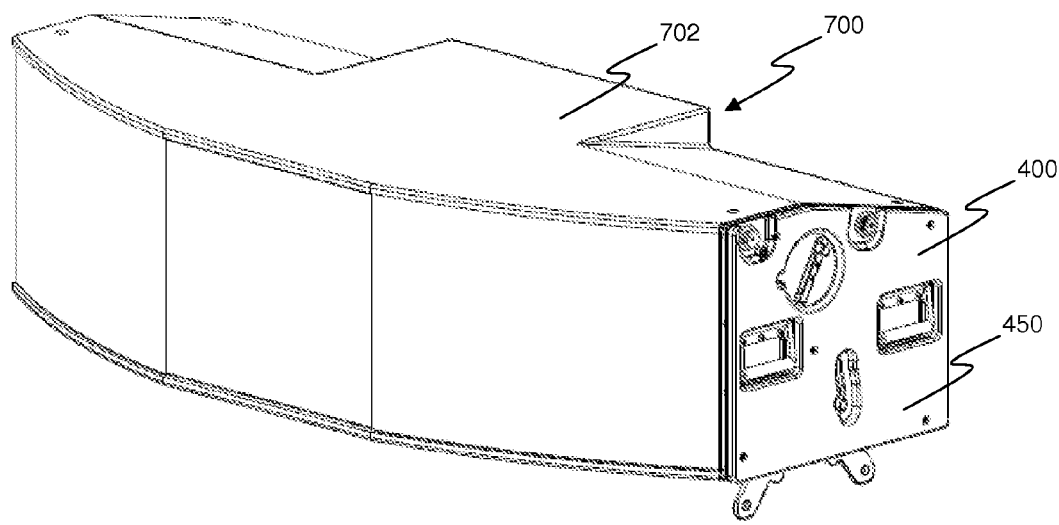

FIG. 7a shows a speaker 700 with a bracket 400 attached to a sidewall thereof. The sidewall forms part of a speaker enclosure 702, inside which an audio driver is positioned. A second bracket (not shown) is attached to the opposite sidewall of the speaker enclosure. The bracket 400 may be fixed to the sidewall of the speaker enclosure 702 by pins. In alternative arrangements, the bracket 400 may be integrated into the speaker enclosure 702. FIG. 7b shows the bracket 400 attached to the speaker enclosure 702 of the speaker 700 with a cover plate 450 fixed to an outer face of the bracket 400.

Figure 8:
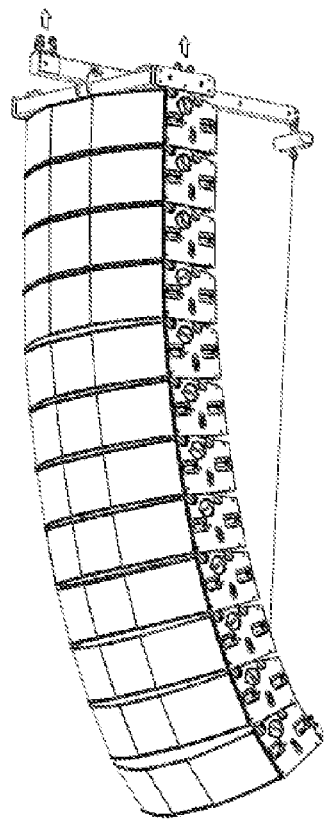
FIG. 8 shows a column of speakers.

When erecting a column comprising a plurality of such speakers, a first speaker is fixed to a special grid or lifting frame. A second speaker is then suspended from the first speaker by connecting the suspension members of the brackets on the first speaker to the frames of the brackets of the second speaker. The amount of rotation of the second speaker is set by rotating the cam to the correct position and locking it off. This process is repeated as many times as required to construct the column. When all the speakers are suspended and their rotations relative to the speaker above are set, the bottom speaker may be pulled rearwards and upwards until all the speakers have reached the limit of their rotation, as set by each cam. That is, the end stop arm of each bracket is engaged with the end stop face of the cam of the same bracket. Typically, this is used to generate a "J" shape to the column. As each of the speakers is rotated about an axis of rotation positioned between it and the speaker above, each of the speakers is aligned with respect to a virtual point source. This arrangement is shown in FIG. 8.

The skilled person will be able to envisage other embodiments without departing from the scope of the invention.

The invention claimed is:

1. A bracket for attachment to a first speaker and for suspending a second speaker therefrom, the bracket comprising:

a suspension member configured for attachment to the second speaker; and a partial trunnion that defines an axis of rotation about which the second speaker is free to rotate when attached to the suspension member, wherein the axis of rotation is outside a boundary of the partial trunnion and the axis of rotation is substantially between the first speaker and the second speaker, and wherein the suspension member comprises two connection arms, each connectable to the second speaker and configured to cooperate with a surface of the partial trunnion to allow the second speaker to rotate freely about the axis of rotation.

2. The bracket according to claim 1, wherein the suspension member comprises two connection arms rotatable about a fulcrum.

3. The bracket according to claim 2, wherein the connection arms are rigidly connected.

4. The bracket according to claim 2, wherein the fulcrum comprises a trunnion that includes the partial trunnion, and wherein a surface of the connection arms is shaped to cooperate with a surface of the trunnion to allow a second speaker to rotate freely about the axis of rotation when attached to the suspension member.

5. The bracket according to claim 1, wherein the end stop is configured to limit rotation of a second speaker suspended from the suspension member when rotated by application of a force, the end stop being further configured to allow the second speaker to return to an equilibrium suspended state when the force is removed.

6. The bracket according to claim 1, wherein the suspension member further comprises an end stop arm configured to move towards the end stop on rotation of a second speaker suspended from the suspension member and engage with the end stop to limit rotation of the second speaker.

7. The bracket according to claim 6, wherein the end stop arm extends perpendicular to the axis of rotation.

8. The bracket according to claim 2, further comprising an end stop arm configured to move towards the end stop on rotation of a second speaker suspended from the suspension member and engage with the end stop to limit rotation of the second speaker, wherein the connection arms and the end stop arm substantially form the shape of a lambda.

9. The bracket according to claim 6, wherein the adjustable end stop is rotatable to present one of a plurality of end stop faces to the end stop arm, wherein each of the plurality of end stop faces defines a different maximum amount of rotation of the second speaker.

10. The bracket according to claim 9, wherein the adjustable end stop comprises a rotatable cam shaped member, and wherein the end stop faces are arranged around an outer edge of the cam shaped member.

11. The bracket according to claim 9, wherein the plurality of end stop faces are configured such that, when the end stop arm is engaged with an end stop face, a force applied by the end stop arm on the end stop face is directed through an axis of rotation of the adjustable end stop.

12. The bracket according to claim 1, further comprising a frame housing the suspension member and attachable to a sidewall of a speaker enclosure of a first speaker, and wherein the suspension member is moveable between a retracted position within the frame and an extended position at which the suspension member is attachable to the second speaker.

13. The bracket according to claim 1, wherein the axis of rotation is substantially equidistant between the first speaker and the second speaker.

14. A speaker comprising an audio driver, a speaker enclosure and a bracket attached to a sidewall of the speaker enclosure, the bracket comprising:

a suspension member configured for attachment to a second speaker; and a partial trunnion that defines an axis of rotation about which the second speaker is free to rotate when attached to the suspension member, wherein the axis of rotation is outside a boundary of the partial trunnion and the axis of rotation is substantially between the speaker and the second speaker, and wherein the suspension member comprises two connection arms, each connectable to the second speaker and configured to cooperate with a surface of the partial trunnion to allow the second speaker to rotate freely about the axis of rotation.

15. A speaker column comprising a plurality of speakers, wherein a plurality of speakers are suspended from a preceding speaker in the column, and wherein each of the plurality of speakers comprises an audio driver, a speaker enclosure and a bracket attached to a sidewall of the speaker enclosure, the bracket comprising:

a suspension member configured for attachment to a second speaker; and a partial trunnion that defines an axis of rotation about which the second speaker is free to rotate when attached to the suspension member, wherein the axis of rotation is outside a boundary of the partial trunnion and the axis of rotation is substantially between a first speaker and the second speaker, and wherein the suspension member comprises two connection arms, each connectable to the second speaker and configured to cooperate with a surface of the partial trunnion to allow the second speaker to rotate freely about the axis of rotation.

* * * * *